(12) United States Patent  
Eguchi et al.

(10) Patent No.: US 6,623,123 B2
(45) Date of Patent: Sep. 23, 2003

(54) OPTICAL UNIT, IMAGE DISPLAY APPARATUS, AND ILLUMINATION ADJUSTMENT METHOD IN AN IMAGE DISPLAY OPTICAL UNIT THE SAME

(75) Inventors: Masaharu Eguchi, Tokyo (JP); Hidefumi Notagashira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/927,126

(22) Filed: Aug. 10, 2001

(65) Prior Publication Data

US 2002/0067469 A1 Jun. 6, 2002

(30) Foreign Application Priority Data

Aug. 10, 2000 (JP) ........................................ 2000-243191
Aug. 11, 2000 (JP) ........................................ 2000-244821

(51) Int. Cl.[7] .................... G03B 21/26; G03B 21/22; G03B 21/28; G03B 5/08; G02F 1/1333
(52) U.S. Cl. ...................... 353/30; 353/31; 353/119; 353/37; 353/99; 353/122; 349/5; 349/58; 359/850; 359/871; 359/872

(58) Field of Search .............................. 353/119, 31, 34, 353/37, 82, 98, 99, 122, 30; 359/850, 871, 872; 349/5, 7, 8, 58; 362/345

(56) References Cited

U.S. PATENT DOCUMENTS 5,651,599 A 7/1997 Fujimori et al. ............... 353/61
5,676,442 A 10/1997 Fujimori ...................... 353/119
2002/0171811 A1 * 11/2002 Kodama et al. ............... 353/31

FOREIGN PATENT DOCUMENTS

| JP | 62-133424 | 6/1987 | .......... G02F/1/133 |
| JP | 11-281876 | 10/1999 | .......... G03B/7/198 |
| JP | 2000-019634 | 1/2000 | .......... G03B/21/00 |
| JP | 2000-305206 | 11/2000 | .......... G03B/33/12 |

* cited by examiner

*Primary Examiner*—Russell Adams
*Assistant Examiner*—Melissa J Koval
(74) *Attorney, Agent, or Firm*—Morgan & Finnegan, L.L.P.

(57) ABSTRACT

The object of the present invention is to miniaturize an optical unit and an image display device. The optical unit of the present invention keeps an optical system so as to form an optical path inside a housing. The optical unit has at least one reflecting optical element, and the at least one reflecting optical element is formed in one body with the housing.

44 Claims, 6 Drawing Sheets

OPTICAL UNIT, IMAGE DISPLAY APPARATUS, AND ILLUMINATION ADJUSTMENT METHOD IN AN IMAGE DISPLAY OPTICAL UNIT THE SAME

BACKGROUND OF THE INVENTION

1. Field of the Invention

The present invention relates to an optical unit that has an optical system including at least a reflecting optical element.

2. Description of the Related Art

Optical units for use in image display devices such as liquid crystal projectors, include the one shown in FIG. 3. This configuration is disclosed in Japanese Unexamined Patent Application Publication No. 2000-19634.

Illumination light from an illumination light source 103 is separated into each color beam of RGB by mirror groups 104, 105, 140 and 150 to 153, including dichroic mirrors 104 and 140, and is guided to liquid crystal panels 110 to 112. Each color image light modulated by the liquid crystal panels 110 to 112, is color-synthesized by a color synthesis prism 102 and is projected from a projecting lens 106 to a screen or the like which is not shown in the figure, thus forming a color image.

The optical path length of each color beam of RGB from the light source 103 to the projecting lens 106 is configured to be roughly equal to each other. Moreover, the above-noted mirror groups are all fixed and arranged inside an optical housing 101.

Additionally, other publications such as U.S. Pat. Nos. 5,651,599 and 5,676,442 and Japanese Examined Patent Application Publication No. 7-15537 also disclose the configuration of liquid crystal projectors. In any configuration, mirror groups (reflecting optical elements) are housed and held in an optical housing.

In order to efficiently use illumination light from the light source 103 in the above-noted configuration, it is necessary to roughly match the irradiation region of each color beam RGB to each image display element 110, 111 and 112, to a screen size of each image display element 110, 111 and 112.

Therefore, an irradiation region of illumination light to an image display element is conventionally positioned by adjusting the angle of reflecting mirrors and dichroic mirrors that are arranged in optical paths. An irradiation region of illumination light is adjusted by using a mirror adjusting mechanism disclosed in, for instance, Japanese Unexamined Patent Application Publication No. 11-281876.

However, in the above-noted configuration where a housing of an optical unit is formed in one body in a box-form and all the reflecting optical elements are housed and held inside the housing, the housing has to have greater volume than an optical system (providing spaces between the housing and the reflecting optical elements for dimensional tolerance) so as to secure a volume to arrange the reflecting optical elements, which are often arranged to surround a liquid crystal panel and color synthesizing prisms or the like. Accordingly, the optical unit becomes large, and an image display device having the optical unit hence becomes large.

Moreover, the inclinations of reflecting mirrors or dichroic mirrors are changed to relocate an irradiation region of illumination light in the conventional image display device, thus distorting the irradiation region and causing so-called trapezoidal distortion. Accordingly, an irradiation region of illumination does not match a screen size of an image display element and illumination becomes uneven, and it is difficult to ideally adjust an irradiation region.

SUMMARY OF THE INVENTION

An optical unit holding an optical system so as to form an optical path inside a housing according to a first aspect of the invention, has at least one reflecting optical element. At least one reflecting optical element is formed in one body with the housing.

An image display device according to a second aspect of the invention has:
the optical unit which has an illumination optical system to guide light from a light source to an image display element;
at least one image display element; and
a projection optical system to project image light from at least one image display element onto a face to be projected.

An optical unit holding an optical system so as to form an optical path inside a housing according to a third aspect of the invention, has:
at least one reflecting optical element. A face opposite a reflection face of the reflecting optical element is exposed to the outside of the housing.

An image display apparatus according to a fourth aspect of the invention has:
the optical unit which has an illumination optical system to guide light from a light source to an image display element;
at least one image display element; and
a projection optical system to project image light from at least one image display element onto a face to be projected.

In accordance with a fifth aspect of the present invention, there is provided an illumination adjustment method in an image display optical unit which has:
a first reflecting optical element having a curved surface to reflect illumination light from a light source;
a second reflecting optical element having a curved surface to reflect illumination light reflected at the first reflecting optical element;
a third reflecting optical element having a curved surface to reflect illumination light reflected at the second reflecting optical element, and to guide light to an image display element; and
a means to shift the first reflecting optical element and the third reflecting optical element relative to the second reflecting optical element. The means essentially prevents changes in a shape and brightness of an irradiation region of the illumination light on the image display element, having a step to adjust position of the irradiation region on the image display element herein by using the means.

In accordance with a sixth aspect of the present invention, there is provide an illumination adjustment method in an image display optical unit which has:
a first reflecting optical element having a curved surface to reflect illumination light from a light source;
a second reflecting optical element having a curved surface to reflect illumination light reflected at the first reflecting optical element;
a third reflecting optical element having a curved surface to reflect illumination light reflected at the second reflecting optical element, and to guide light to an image display element; and
a means to shift the first reflecting optical element and the third reflecting optical element relative to the second reflecting optical element. The means shifts the first reflecting optical element and the third reflecting optical element parallel to a direction which is orthogonal to a normal of a reflection face of the second reflecting optical element, having a step to adjust position of and the means positions the irradiation region on the image display element herein by using the means.

In accordance with a seventh aspect of the present invention, there provided is an illumination adjustment method in an image display optical unit which has:

a first reflecting optical element having a curved surface to reflect illumination light from a light source;

a second reflecting optical element having a curved surface to reflect illumination light reflected at the first reflecting optical element;

a third reflecting optical element having a curved surface to reflect illumination light reflected at the second reflecting optical element, and to guide light to an image display element; and a means to shift the second reflecting optical element relative to the first reflecting optical element and the third reflecting optical element. The means essentially prevents changes in a shape and brightness of an irradiation region of the illumination light on the image display element, having a step to adjust position of the irradiation region on the image display element herein by using the means.

In accordance with an eighth aspect of the present invention, there is provided an illumination adjustment method in an image display optical unit which has:

a first reflecting optical element having a curved surface to reflect illumination light from a light source;

a second reflecting optical element having a curved surface to reflect illumination light reflected at the first reflecting optical element;

a third reflecting optical element having a curved surface to reflect illumination light reflected at the second reflecting optical element, and to guide light to an image display element; and a means to shift the second reflecting optical element relative to the first reflecting optical element and the third reflecting optical element. The means shifts the second reflecting optical element parallel to a direction which is orthogonal to a normal of a reflection face of the second reflecting optical element, having a step to adjust position of the irradiation region on the image display element herein by using the means.

An image display optical unit according to a ninth aspect of the invention has:

a first reflecting optical element having a curved surface to reflect illumination light from a light source;

a second reflecting optical element having a curved surface to reflect illumination light reflected at the first reflecting optical element;

a third reflecting optical element having a curved surface to reflect illumination light reflected at the second reflecting optical element, and to guide light to an image display element; and a housing to hold the image display element. The housing has reference guide faces to shift and guide the first and the third reflecting optical elements into a direction where a shape and brightness of an irradiation region to the image display element essentially do not change during positioning of the irradiation region of illumination light to the image display element. The first and the third reflecting optical elements are fixed onto the reference guide faces herein.

An image display optical unit according to a tenth aspect of the invention has:

a first reflecting optical element having a curved surface to reflect illumination light from a light source;

a second reflecting optical element having a curved surface to reflect illumination light reflected at the first reflecting optical element;

a third reflecting optical element having a curved surface to reflect illumination light reflected at the second reflecting optical element, and to guide light to an image display element; and a housing to hold the image display element. The housing has a reference guide face to shift and guide the second reflecting optical element relative to the first and the third reflecting optical elements into a direction where a shape and brightness of an irradiation region to the image display element essentially do not change during positioning of the irradiation region of illumination light to the image display element. The second reflecting optical element is fixed onto the reference guide face herein.

An image display optical unit according to an eleventh aspect of the invention has:

a first reflecting optical element having a curved surface to reflect illumination light from a light source;

a second reflecting optical element having a curved surface to reflect illumination light reflected at the first reflecting optical element;

a third reflecting optical element having a curved surface to reflect illumination light reflected at the second reflecting optical element, and to guide light to an image display element; and a housing to hold the image display element. The housing has a reference guide face to parallel shift and guide the second reflecting optical element relative to the first and the third reflecting optical elements into an orthogonal direction to a normal of a reflection face of the second reflecting optical element during positioning of the irradiation region of illumination light to the image display element. The second reflecting optical element is fixed onto the reference guide face herein.

DESCRIPTION OF THE PREFERRED EMBODIMENT

Embodiment 1

Figure 1:
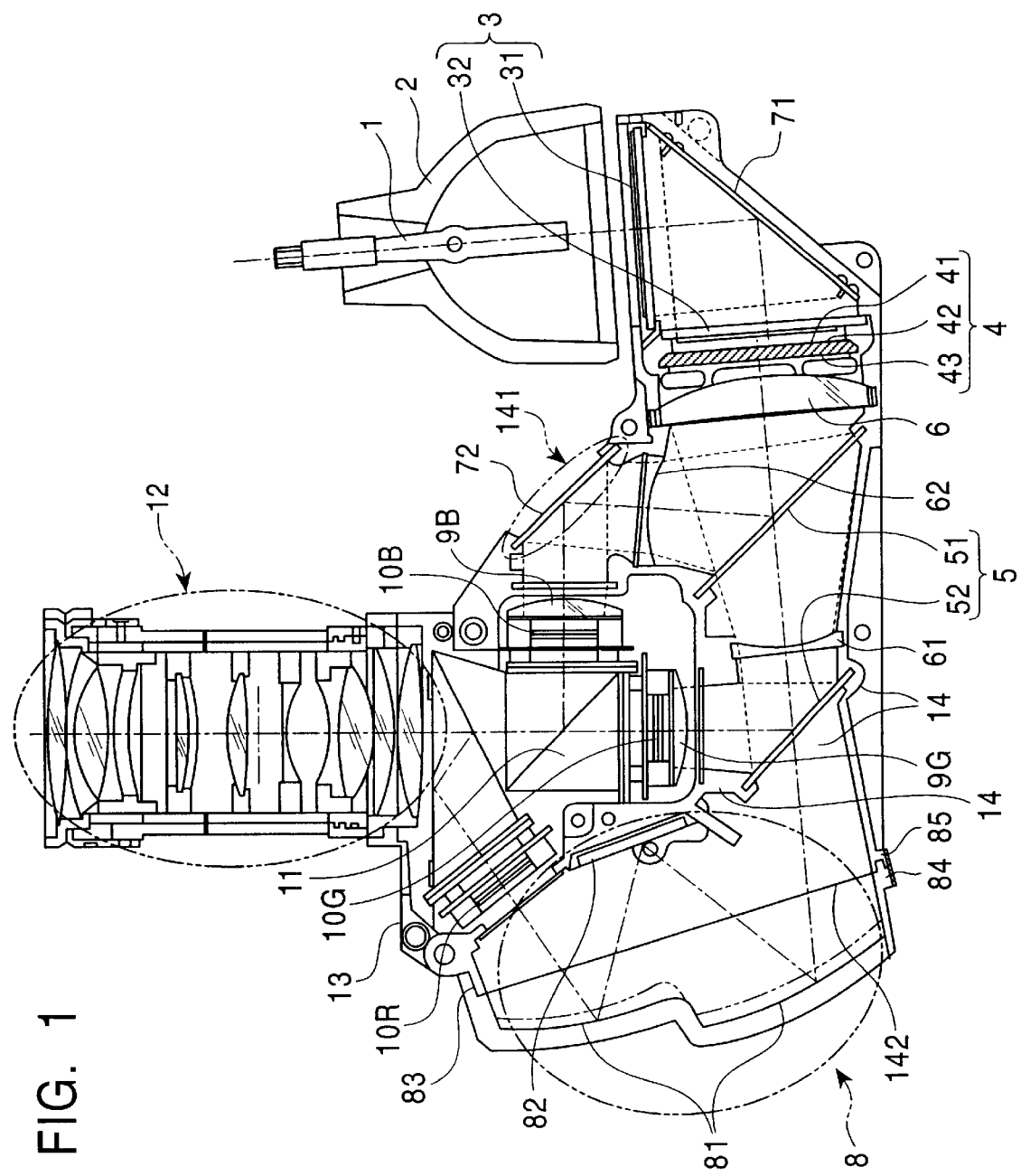
FIG. 1 is a diagram, showing a configuration of an optical unit of a first embodiment of the present invention.

FIG. 1 shows a configuration of an optical unit equipped in a liquid crystal projector (image display apparatus) of a first embodiment of the present invention.

In this figure, reference numeral 1 indecates a light source lamp such as a metal halide lamp and a mercury lamp, and reference numeral 2 indicates a reflector consisting of a parabolic face or an ellipsoidal face.

Reference numeral 3 indicates an integrator consisting of a first lens array 31 and a second lens array 32, and reference numeral 4 indecates a polarization converting element consisting of a plurality of polarization separating faces 41, a plurality of reflection faces 42 corresponding to the polarization separating faces 41, and a plurality of phase plates 43.

Reference numeral 5 indicates a color separation system which consists of a blue reflection dichroic mirror 51 and a red transmission dichroic mirror 52, and reference numeral 6 indicates a collective lens to collect diffused light from the polarization converting element 4 onto liquid crystal display panels (image display elements, which will be referred to as liquid crystal panels hereinafter) 10R, 10G and 10B. In this embodiment, the collective lens 6 is used along with concave lenses 61 and 62, so that optical path lengths are further compressed. Moreover, reference numeral 71 indicates a plane mirror, and reference numeral 72 is a plane dichroic mirror (reflecting optical element).

The plane dichroic mirror 72 is made by depositing a blue reflection dichroic film on a transparent glass base material. A polarization separating film may be formed, instead of the dichroic film.

Reference numeral 8 indicates a relay system which is configured as a reflecting optical system, consisting of a molded relay mirror (reflecting optical element) 81 internally having two concave mirrors (reflection faces) and a mirror 82 facing the molded relay mirror 81.

The molded relay mirror 81 is made by mirror-finishing two concave faces of a base material part (body part) which is a molded transparent polycarbonate resin, and by depositing dichroic films on the concave faces. The dichroic films reflect light of red wavelength and transmit light on a longer wavelength side than the red wavelength. Then, non-red beams which transmitted through the dichroic films, turn into heat at the base material member.

The molded relay mirror 81 may be made by depositing polarization separating films on the concave faces.

Condenser lenses 9G and 9B collect illumination light (light of green wavelength and of blue wavelength) onto liquid crystal panels 10G and 10B. A liquid crystal panel 10R is a liquid crystal panel for red; the liquid crystal panel 10G is a liquid crystal panel for green; and the liquid crystal panel 10B is a liquid crystal panel for blue.

Reference numeral 11 indicates a color synthesis prism which is internally formed with two dichroic films to reflect one beam having a different wavelength from the other beam and transmit the other beam. This color synthesis prism basically has the same structure as a so-called 3P prism for a 3CCD camera, and is used for projection. As workability is concerned, four prisms are combined for the color synthesis prism 11 in this embodiment.

A projecting lens 12 has a positive refractive power, enlarging a color synthesized image from the color synthesis prism 11 and projecting the image on a screen or the like, not shown in the figure.

A base mount member 13 fixes and holds the color synthesis prism 11 and the projecting lens 12.

Each component mentioned above is fixed and held to a housing 14. The housing 14 is a molded article made of a material in which glass is added to unsaturated polyester.

The housing 14 has openings 141 and 142. The plane dichroic mirror 72 and the molded relay mirror 81 are fixed and held at the periphery of the openings 141 and 142, respectively, so as to close the openings 141 and 142. The plane mirror 71 is fixed inside of the housing 14.

An elastic spacer is fixed to inserting parts at the periphery of an optical path for eliminating backlash, and the plane dichroic mirror 72 is inserted to grooves formed at an inner side of the opening 141 of the housing 14, thus fixing the plane dichroic mirror 72 to the housing 14.

The molded relay mirror 81 is joined and fixed to the circumference of the opening 142 of the housing 14 to allow positioning. The molded relay mirror 81 is fixed to the housing 14 by forming a fitting groove (insert-shape part) 83 at the periphery of the opening 142 of the housing 14 and by joining the molded relay mirror 81 having the corresponding shape to the groove. The molded relay mirror 81 is positioned relative to the housing 14 by joining a dowel formed at the molded relay mirror 81 to a positioning hole 84 of the housing 14.

The molded relay mirror 81 and the housing 14 may be positioned to each other by joining a dowel formed at the housing 14 to a positioning hole of the molded relay mirror 81, or by holding with a tool not shown in the figure. Then, after the molded relay mirror 81 and the housing 14 are positioned, the molded relay mirror 81 is fixed to the housing 14 by a single or a plurality of fixing methods such as screwing, bonding with UV-curable, epoxy-based or cyano bonds, heat adhesion, and fixing by spring pressure of a plate spring such as a clip spring 84 or a piano wire.

In the optical unit mentioned above, white illumination light emitted from the light source lamp 1 (and the reflector 2) is reflected at the plane mirror 71 and is made incident to a color separation system through the polarization converting element 4.

Among illumination beams input to the blue reflection dichroic mirror 51, a blue color beam is reflected at the blue reflection dichroic mirror 51 and other color beams transmit through the blue reflection dichroic mirror 51. The blue color beam reflected at the blue reflection dichroic mirror 51, is reflected at the plane mirror 72 and is collected by the condenser lens 9B, thus illuminating the liquid crystal panel for blue 10B.

The color beams transmitted through the blue reflection dichroic mirror 51 are input to the red transmission dichroic mirror 52. Among the color beams made incident to the red transmission dichroic mirror 52, a green color beam is reflected at the red transmission dichroic mirror 56 and is collected by the condenser lens 9G, thus illuminating the liquid crystal panel for green 10G.

Furthermore, a red color beam transmitted through the red transmission dichroic mirror 52 is reflected at a first concave mirror of the molded mirror relay 81, and is reflected at the concave mirror of the facing mirror 82, and is furthermore reflected at a third concave mirror of the molded mirror relay 81, thus illuminating the liquid crystal panel for red 10R.

Each color beam modulated at each liquid crystal panel 10B, 10G and 10R and transmitted through the liquid crystal panels 10B, 10G and 10R, is synthesized inside the color synthesis prism 11 and is emitted as synthesized color image light through the projecting lens 12.

The molded relay mirror 81 is fixed to the housing 14 so as to expose the external surface (surface opposite to the dichroic film) to the outside of the housing, so that the surface itself constitutes a part of the housing. In other words, a dichroic film is formed as a reflecting optical element in one body with the housing.

Moreover, the plane mirror 72 is also fixed to the housing 14 so as to expose the external surface (surface opposite to the mirror surface) to the outside of the housing.

In other words, since the outside of the molded relay mirror 81 and the plane mirror 72 is not covered with the housing 14, the optical unit can be miniaturized in comparison with a conventional optical unit where these mirrors are covered with a housing with spaces therebetween.

Moreover, the base material of the molded relay mirror 81 is formed with shapes (concave faces) of two dichroic films, and is miniaturized, so that the optical unit can be further reduced in size.

As the plane mirror 72 and the molded relay mirror 81 are fixed to the housing 14 so as to close the openings 141 and 142, illumination optical paths of the liquid crystal panels 10R, 10G and 10B which shield light from the outside, can be formed in a space surrounded by the plane mirror 72, the molded relay mirror 81 and the housing 14.

Moreover, since a transparent base material is used for the molded relay mirror 81 and the mirror is fixed so as to be exposed to the outside of the housing, light transmitted through the dichroic films (or polarization separating films) can be directly absorbed at the base material. Thus, heat generated by the treatment of unnecessary light can be efficiently transmitted to the outside of the housing.

When a mirror member made of an opaque base material seals the inside of a housing, the mirror member heats up due to heat generated at the mirror member. Thus, adhesion strength between the base material and a mirror film deteriorates, and reliability is likely to decrease. However, in the embodiment, the molded relay mirror 81 can be easily cooled by air circulating around the housing, so that reliability increases.

Therefore, not only resin but also metal can be used as a base material for the molded relay mirror 81 without any concern.

When polycarbonate is used for the base material of the molded relay mirror 81, carbon is added to make it opaque since the material is transparent. Accordingly, the mirror can efficiently absorb light of visible regions, and the base material has improved strength. With such a molded relay mirror 81, the reduction of an outside dimension and radiation of heat can be further efficient.

On the other hand, the plane mirror 72 is fixed to be exposed to the outside of the housing, so that light of long wavelengths, except for a blue color beam, passes through the transparent glass base material of the plane mirror 72 and the opening 141 and then emits to the outside of the housing 14. Accordingly, the optical unit can prevent heating due to unnecessary light at the plane mirror 72.

Figure 2:
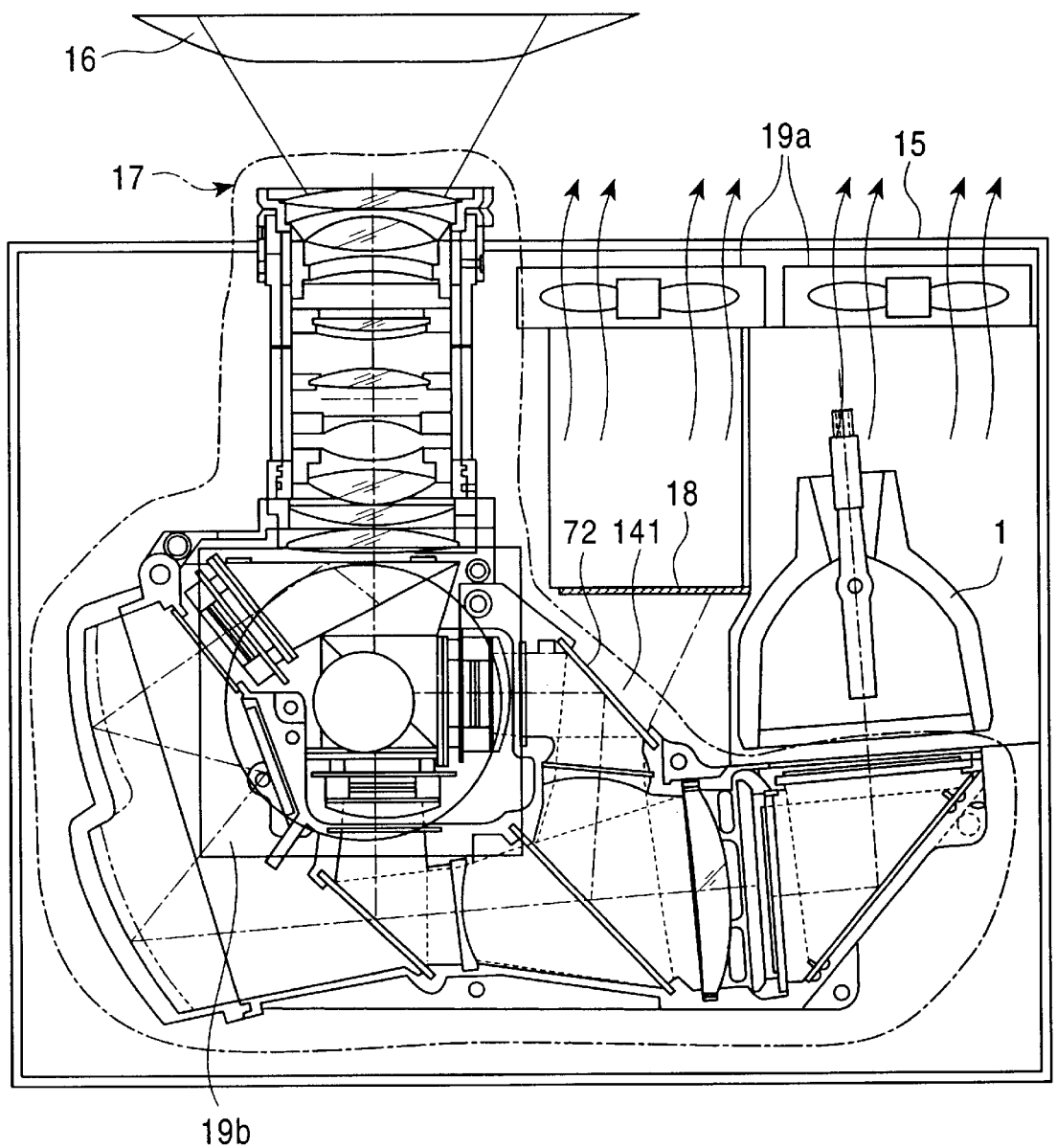
FIG. 2 is a diagram, showing a configuration of a liquid crystal projector having the optical unit.
Figure 3:
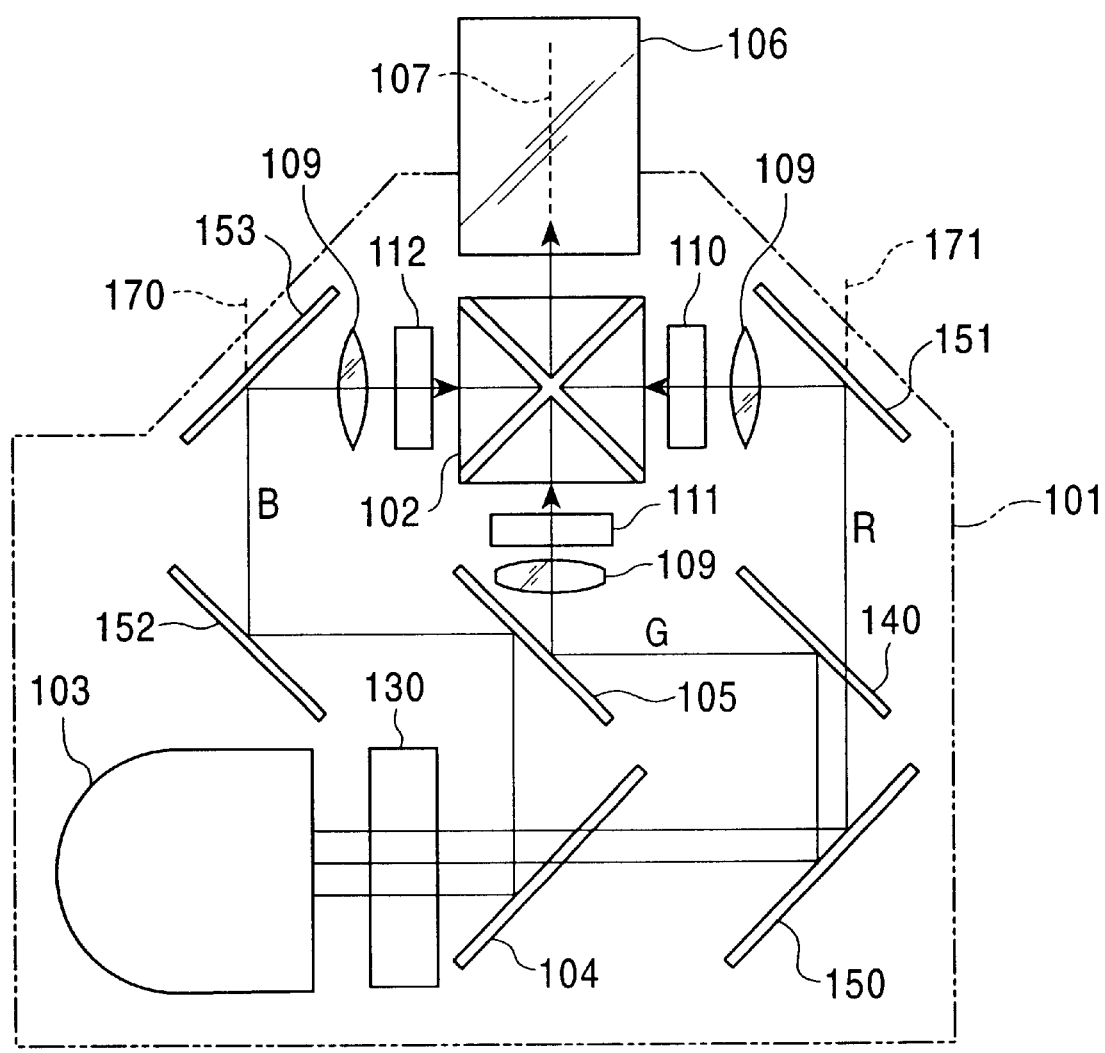
FIG. 3 is a diagram, showing a schematic configuration of a conventional optical unit.

FIG. 2 shows an entire configuration of a liquid crystal projector having the optical unit mentioned above.

In this figure, a projector housing 15 contains the optical unit 17, and reference numeral 16 indicates a projection screen. The projector housing 15 is formed in a box shape, and is made of magnesium alloy. The projector housing 15 is mounted with an intake fan 19a and an exhaust fan 19b, efficiently cooling off the inside of the projector housing 15.

The projector has a power system, a lamp ballast, an image/voice input output circuit, an image processing circuit, a liquid crystal driving circuit, a voice processing circuit, a speaker, an operation switch, and the like not shown in the figure. The projector is used as a display device to enlarge and project image information from an image supply device such as a television, a video and a computer onto the projection screen 16.

The projector makes unnecessary light which transmitted through the plane dichroic mirror 72 of the optical unit 17 and was emitted out of the optical unit 17, hit a metal plate 18 (for instance, aluminum case of a power unit, or a member made of light alloy such as aluminum and magnesium alloy), provided in an air passage from the intake fan 19a to the exhaust fan 19b.

The metal plate 18 is coated with black coating for antireflection. Unnecessary light hitting the metal plate 18 is converted into heat and the heat is radiated to the outside.

Conventionally, unnecessary light transmitted through a mirror which is equivalent to the plane dichroic mirror 72, hits against a housing inner wall of an optical unit for absorption and heat radiation. Thus, cooling effects are poor. However, the absorption and heat radiation of unnecessary light can be efficiently performed in the embodiment.

It is also possible to take advantage of the absorption characteristics (low spectral transmittance) of a glass base material at a non-visible ultraviolet region, and to select a glass material having a high absorption coefficient for spectral components having negative effects on liquid crystal properties, as a glass material of the plane dichroic mirror 72. In this case, mirror coating is applied on the back side (side opposite to a dichroic film face) of the glass base material, so that unnecessary light transmitted through the dichroic film, reflects and proceeds into the glass base material. Thus, it becomes possible to perform both heat radiation and light emission to the outside of the base material at the same time.

In this case, as transmitted light reflects and proceeds into the glass base material, the thickness of a glass plate in proportion to light absorption is thinner around the same light transmission distance than the case of simply inserting the glass as a filter in an orthogonal direction to an optical path. Accordingly, less glass is required as a material, thereby reducing the price and weight.

The optical unit of the embodiment is used for an image display unit, but the optical unit of the present invention may be used not only for an image display apparatus but also for other apparatus. Moreover, image display elements, other than liquid crystal panels, may be used.

As described above, reflecting optical elements are provided in one body and are used as a part of a housing in the embodiment, which is the same as providing a reflection face to a housing itself. Thus, in comparison with the conventional case where the outside of reflecting optical elements is covered with a housing with spaces therebetween, an optical unit can be miniaturized. Accordingly, an image display unit having the optical unit can also be miniaturized.

Particularly, the size of an optical unit can be reduced to a great extent when, in the optical unit, reflecting optical elements are arranged to surround image display elements, a color synthesis prism and so forth and the outside dimension of a housing is determined by the position of reflecting optical elements.

Furthermore, when parts where the reflecting optical elements are provided in a housing (element installing parts), have a shape along the shape of the reflecting optical elements in the embodiment or when a face which is opposite to a reflection face of reflecting optical elements, has a shape along the shape of the reflection face in a second invention, the element installing parts or reflecting optical elements can be reduced in size to the maximum extent. Optical units can also be further miniaturized.

Moreover, the element installing parts of a housing and main body parts of reflecting optical elements are formed of a high polymer material or a metal material, thus increasing the strength of the element installing parts and main body parts and improving the precision of a reflection face. When polycarbonate or a composite material containing polycarbonate, in particular, is used as a high polymer material, both strength and heat resistance can be ensured.

If element installing parts of a housing are constituted separately from other parts of the housing or if reflecting optical elements are fixed to a housing, reflection faces could be easily deposited or applied to the element installing parts and reflecting optical elements during manufacturing processes. Moreover, reflection faces can be easily inspected or exchanged as parts.

Embodiment 2

Figure 4:
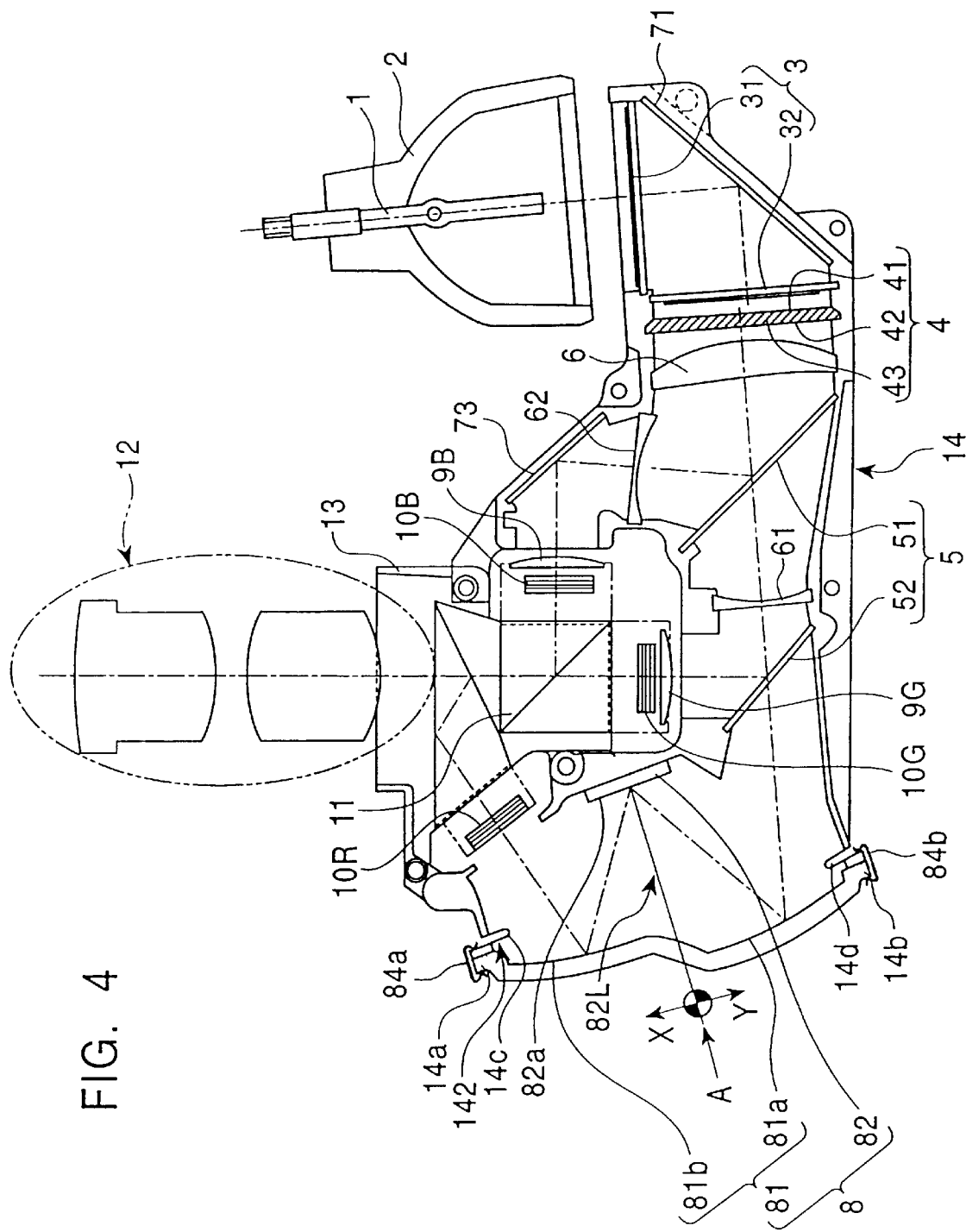
FIG. 4 is a diagram, showing a configuration of an optical unit of a second embodiment of the present invention.

FIG. 4 shows a second embodiment of the present invention. The figure shows a configuration of an image display optical unit equipped in a liquid crystal projector (image display apparatus). The figure shows a state during optical adjustment in the optical unit. The same reference numerals as in the first embodiment indicate the same members in the second embodiment, so that the explanation thereof is omitted.

In FIG. 4, reference numeral 73 indicates a plane mirror, and reference numeral 8 indicates a relay system. A reflecting optical system is constituted of a molded relay mirror (first and third reflecting optical elements formed in one body) 81 having a first concave reflection face (curved reflection face) 81a and a third concave reflection face curved reflection face) 81b, and a facing mirror (second reflecting optical element) 82 arranged to face the molded relay mirror 81 and having a second concave reflection face (curved reflection face) 82a, inside the relay system.

The facing mirror 82 is made by depositing a reflection film on a concave part of a base material molded of opaque polycarbonate resin, and is fixed to a housing 14.

Each component mentioned above is fixed and held at the housing 14. The housing 14 is a molded article made of a material in which glass is added to unsaturated polyester. The housing 14 has an opening 142, and the molded relay mirror 81 is fixed to the circumference of the opening 142 to close the opening 142.

More specifically, the molded relay mirror 81 is in contact with reference guide faces 14a and 14b which are formed at the circumference of the opening 142 in the housing 14 and are the ends of flange-form parts. Flange-form parts of the molded relay mirror 81 and the flange-form parts of the housing 14 are inserted with clip springs 84a and 84, and are thus temporarily locked to the housing 14.

The reference guide faces 14a and 14b of the housing 14 are parallel faces in an orthogonal direction to a normal 82L of a reflection face of the facing mirror 82. Cut parts (parts that absorb a difference in deformations due to a change in environmental temperature) 14c and 14d are provided near the opening part 142 of the housing 14.

The molded relay mirror 81 is a separate part from the housing 14 herein, and an irradiation region of a red color beam of illumination light is positioned in relation to a liquid crystal panel for red 10R by adjusting the position of the mirror during optical adjustment after the assembly of a unit.

Subsequently, the positioning of the molded relay mirror 81 (positioning of an irradiation region of a red color beam in relation to the liquid crystal panel for red 10R) will be explained.

Figure 5:
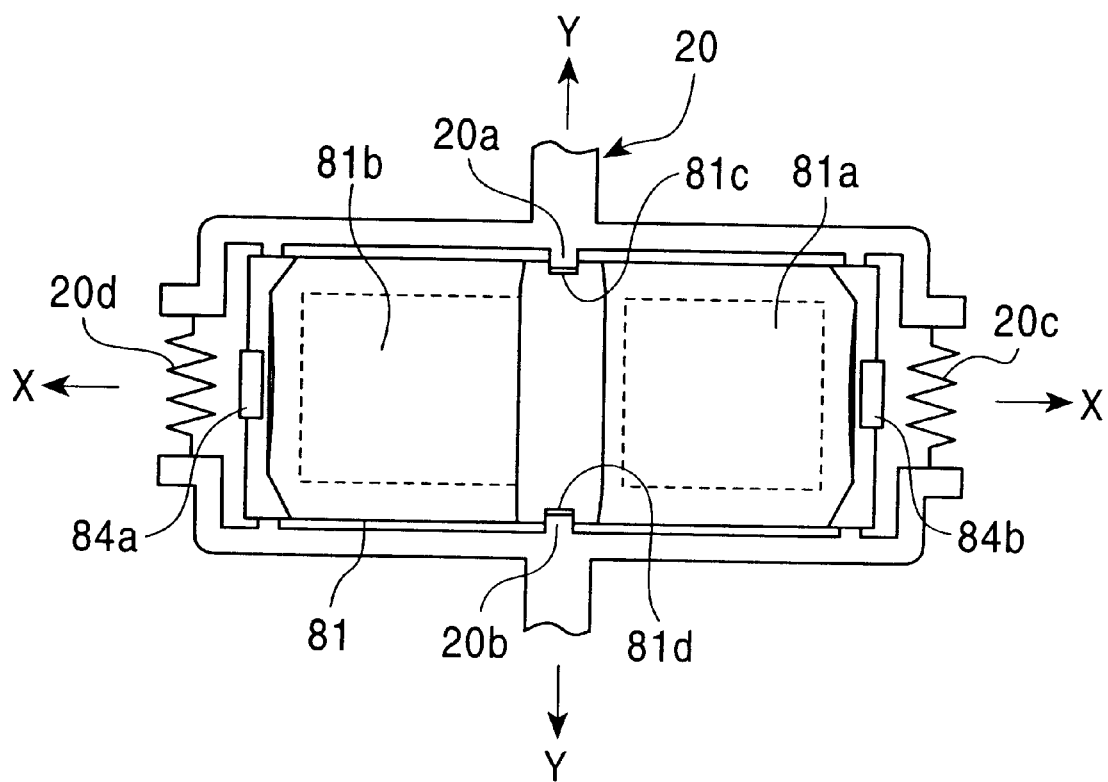
FIG. 5 is a diagram, showing a state where a molded relay mirror in the optical unit in the second embodiment of the present invention is held by a tool for adjustment.

FIG. 5 shows a state where the molded relay mirror 81 is seen from an A direction in FIG. 4 during positioning, and the molded relay mirror 81 is held by a tool for adjustment 20.

The molded relay mirror 81 held by the tool for adjustment 20, is temporarily locked to the housing 14 with clip springs 84a and 84b. The molded relay mirror 81 is in contact with the reference guide faces 14a and 14b of the housing 14 with slidable surface pressure in this state.

The tool for adjustment 20 is divided into two in a longitudinal direction (Y direction) in FIG. 5. While positioning protrusions 20a and 20b formed at both split parts, are fit to grooves 81c and 81d formed at the molded relay mirror 81, springs 20c and 20d add force to move the split parts closer to each other, thereby sandwiching and holding the molded relay mirror 81.

While light is emitted from the light source lamp 1 in this state and an irradiation region of a red color beam to the liquid crystal panel 10R is being checked, the tool for adjustment 20 is shifted in an X-X direction and a Y-Y direction along with the molded relay mirror 81. In this case, the molded relay mirror 81 does not shift in the direction of the normal 82L of the facing mirror 82 as it is temporarily locked. Moreover, as the molded relay mirror 81 is guided in a slidable manner by the reference guide faces 14a and 14b of the housing 14, the molded relay mirror 81 can be easily positioned in the X-X direction and the Y-Y direction.

When the molded relay mirror 81 shifts in the X-X direction and the Y-Y direction, the inclination of the optical axis and the optical path length of a red color beam hardly change and the position of the optical axis shifts to the X-X direction and the Y-Y direction. Thus, due to the positioning of the molded relay mirror 81 in the X-X direction and the Y-Y direction, an irradiation region can be shifted without essentially changing the shape (shape and size) and brightness of the irradiation region of a red color beam to the liquid crystal panel for red 10R, in other words, without causing trapezoidal distortion or the like to the irradiation region and without changing the entire brightness and causing uneven illumination.

"Without essentially changing the shape and brightness of the irradiation region of illumination light" in claims and the embodiment means that the shape and brightness of the irradiation region of illumination light do not change enough to cause problems in image display or illumination of a liquid crystal panel.

Thus, if the molded relay mirror 81 is positioned at an appropriate position, for instance, where the center of the irradiation region of a red color beam matches the center of the image display region of the liquid crystal panel 10R, the following conditions can be prevented: a part of an image display region is not illuminated; sufficient brightness is not obtained on the image display region; and brightness becomes uneven.

The first reflecting optical element and the third reflecting optical element may be separate components in the present invention. However, they may be in one body as in the embodiment. Thus, the positioning of the first reflecting optical element and the third reflecting optical element (adjustment of an irradiation region of illumination light) can be easily carried out in comparison with the case of carrying out separately.

After positioning the molded relay mirror 81, the molded relay mirror 81 is fixed to the housing 14 by a general means or method while the molded relay mirror 81 is kept in contact with the reference guide faces 14a and 14b. In other words, the mirror is fixed and held by a single or a plurality of means or methods such as screwing, bonding (with UV-curable, epoxy-based, cyano bonds and the like), heat adhesion, and fixing by spring pressure of a clip spring, a plate spring or a piano wire, and the like.

The molded relay mirror 81 is fixed to the housing 14 thereby so as to expose a surface opposite to the reflection face, to the outside of the housing 14 and thus to constitute a part of the housing 14.

Subsequently, the effect of a change in environmental temperature on the optical unit will be explained. As described above, unsaturated polyester (UP) is used for the housing 14 of the embodiment since heat resistance is required and molding is carried out. Polycarbonate (PC) or the like is used for the base material of the molded relay mirror 81 since the concave reflection faces 81a and 81b are formed.

The internal temperature of the optical unit increases during use. When the housing 14 deforms more than the molded relay mirror 81, the molded relay mirror 81 deforms more than its thermal deformation due to a difference in coefficients of thermal expansion between the housing 14 and the molded relay mirror 81.

The housing 14 of the embodiment has the cut parts 14c and 14d. Thus, extra deformation of the molded relay mirror 81 of the housing 14 is absorbed as parts near the cut parts 14c and 14d of the housing 14 deform in an orthogonal direction to the normal 82L of the facing mirror 82. Accordingly, the first concave reflection face 81a and the third concave reflection face 81b of the molded relay mirror 81 are not deformed by the deformation of the housing 14, and illumination to the liquid crystal panel 10R can be appropriately kept without depending on environmental temperature.

Embodiment 3

Figure 6:
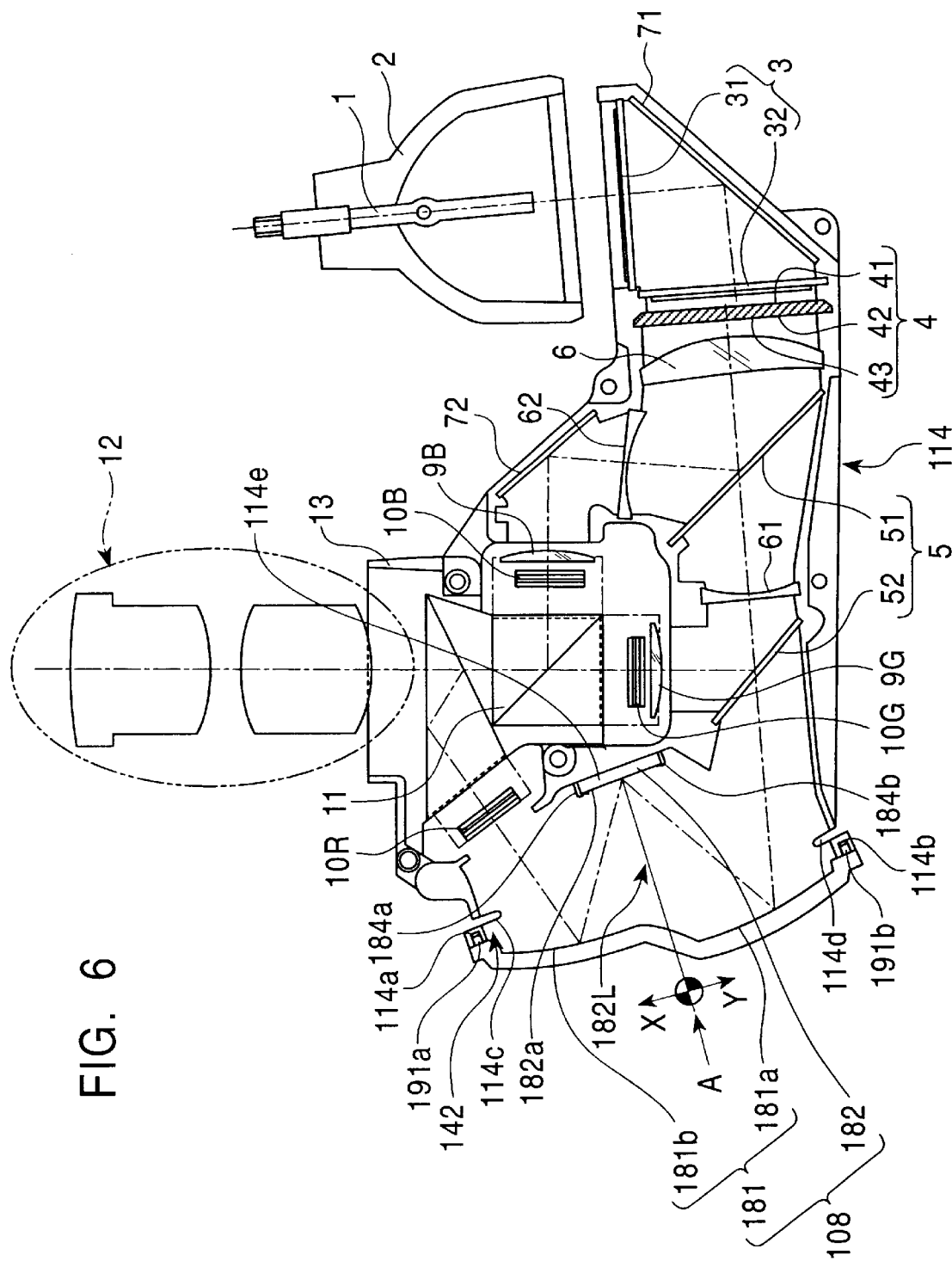
FIG. 6 is a diagram, showing a configuration of an optical unit of a third embodiment of the present invention.

FIG. 6 shows a third embodiment of the present invention. The figure shows a configuration of an image display optical unit equipped in a liquid crystal projector (image display apparatus). The figure shows a state during optical adjustment in the optical unit. The same components as in the first embodiment have the same reference numerals, and the explanation thereof is omitted.

A relay system 108 is a reflecting optical system constituted of a molded relay mirror 181 having a first concave reflection face 181a and a third concave reflection face 181b, and a facing mirror 182 having a second reflection face 182a.

The molded relay mirror 181 is made by mirror-finishing two concave parts of a base material part which is a molded opaque polycarbonate resin, and by depositing dichroic films on the concave parts. The molded relay mirror 181 is fixed to a housing 114 by fitting positioning pins 191a and 191b to positioning holes 114a and 114b which are formed in a flange-form at the circumference of the opening 142 of the housing 114.

Accordingly, the molded relay mirror 181 is fixed to the housing 114 so as to expose a surface opposite to its reflection face, to the outside of the housing 114 and thus to constitute a part of the housing 114.

Moreover, polarization separating films may be deposited on the concave parts of the molded relay mirror 181.

The facing mirror 182 is made by depositing a total reflection film on a concave part of a base material part which is a molded opaque polycarbonate resin.

The facing mirror 182 is in contact with a reference guide face 114e formed inside the housing 114, and is temporarily locked with clip springs 184a and 184b.

The reference guide face 114e of the housing 114 is a parallel face in an orthogonal direction to a normal 182L of a reflection face of the facing mirror 182. The housing 114 has cut parts (parts to absorb deformation due to a change in environmental temperature) 114c and 114d near the opening 142.

In the optical unit described above, white illumination light from the light source lamp 1 (and the reflector 2) is reflected at the plane mirror 71 and is made incident to a color separation system through the polarization converting element 4.

Among illumination beams input to the blue reflection dichroic mirror 51, a blue color beam is reflected at the blue reflection dichroic mirror 51 and other color beams transmit through the blue reflection dichroic mirror 51. The blue color beam reflected at the blue reflection dichroic mirror 51, is reflected at the plane mirror 72 and is collected by the condenser lens 9B, thus illuminating the liquid crystal panel for blue 10B.

The color beams transmitted through the blue reflection dichroic mirror 51 are input to the red transmission dichroic mirror 52. Among the color beams made incident to the red transmission dichroic mirror 52, a green color beam is reflected at the red transmission dichroic mirror 56 and is collected by the condenser lens 9G, thus illuminating the liquid crystal panel for green 10G.

Furthermore, a red color beam transmitted through the red transmission dichroic mirror 52 is reflected at the first concave reflection mirror 181a of the molded mirror relay 181, is reflected at the second concave reflection mirror 182a of the facing mirror 182, and is furthermore reflected at the third concave reflection mirror 181b of the molded mirror relay 181, thus illuminating the liquid crystal panel for red 10R.

Each color beam modulated at each liquid crystal panel 10B, 10G and 10R and transmitted through the liquid crystal panels 10B, 10G and 10R, is synthesized inside the color synthesis prism 11 and is emitted as synthesized color image light through the projecting lens 12.

The irradiation region of a red beam of illumination light is positioned in relation to the liquid crystal panel for red 10R by adjusting the position of the facing mirror 182 during optical adjustment after the assembly of a unit.

Subsequently, the positioning of the facing mirror 182 (positioning of the irradiation region of a red color beam in relation to the liquid crystal panel for red 10R) will be explained.

The facing mirror 182 held by a tool for adjustment not shown in the figure, is temporarily locked to the housing 114 with the clip springs 184a and 184b. The facing mirror 182 is in contact with the reference guide face 114e of the housing 114 in this state with slidable surface pressure.

While light is emitted from the light source lamp 1 in this state and the irradiation region of a red color beam to the liquid crystal panel 10R is being checked, the tool for adjustment is shifted in an X-X direction and a Y-Y direction along with the facing mirror 182. In this case, the facing mirror 182 does not shift in the direction of the normal 182L as it is temporarily locked. Moreover, as the facing mirror 182 is guided in a slidable manner by the reference guide face 114e of the housing 114, the facing mirror 182 can be easily positioned in the X-X direction and the Y-Y direction.

When the facing mirror 182 shifts in the X-X direction and the Y-Y direction, the inclination of the optical axis and the optical path length of a red color beam hardly change and the position of the optical axis shifts to the X-X direction and the Y-Y direction. Thus, due to the positioning of the facing mirror 182 in the X-X direction and the Y-Y direction, the irradiation region can be shifted without essentially changing the shape (shape and size) and brightness of the irradiation region of a red color beam to the liquid crystal panel for red 10R; in other words, without causing trapezoidal distortion or the like to the irradiation region and without changing the entire brightness and causing uneven illumination.

"Without essentially changing the shape and brightness of the irradiation region of illumination light" herein means the same as in the second embodiment.

Thus, if the facing mirror 182 is positioned at an appropriate position, for instance, where the center of the irradiation region of a red color beam matches the center of an image display region of the liquid crystal panel 10R, the following conditions could be prevented: a part of the image display region is not illuminated; sufficient brightness is not obtained on the image display region; and brightness becomes uneven.

After positioning the facing mirror 182, the facing mirror 182 is fixed to the housing 114 by a general means or method while the mirror is kept in contact with the reference guide face 114e of the housing 114. In other words, the mirror is fixed and held by a single or a plurality of means or methods such as screwing, bonding (with UV-curable, epoxy-based, cyano bonds and the like), heat adhesion, and fixing by spring pressure of a clip spring, a plate spring or a piano wire, and the like.

Subsequently, the effect of a change in environmental temperature on the optical unit will be explained. As described above, unsaturated polyester (UP) is used for the housing 114 of the embodiment since heat resistance is required and molding is carried out. Polycarbonate (PC) or the like is used for the base material of the molded relay mirror 181 since the concave reflection faces 181a and 181b are formed.

The internal temperature of the optical unit increases during use. When the housing 114 deforms more than the molded relay mirror 181, the molded relay mirror 181 deforms more than its thermal deformation due to a difference in coefficients of thermal expansion between the housing 114 and the molded relay mirror 181.

The housing 114 of the embodiment has the cut parts 114c and 114d. Thus, extra deformation of the molded relay mirror 181 of the housing 114 is absorbed as parts near the cut parts 114c and 114d of the housing 114 deform in an orthogonal direction to the normal 182L of the facing mirror 182. Accordingly, the first concave reflection face 181a and the third concave reflection face 181b of the molded relay mirror 181 are not deformed by the deformation of the housing 114, and illumination to the liquid crystal panel 10R can be appropriately kept without depending on environmental temperature.

The optical unit of each embodiment mentioned above is housed in a housing of a liquid crystal projector not shown in the figure. The projector has a power system, a lamp ballast, an image/voice input output circuit, an image processing circuit, a liquid crystal driving circuit, a voice processing circuit, a speaker, an operation switch, and the like. The projector is used as a display apparatus to enlarge and project image information from an image supply device such as a television, a video and a computer onto a projection screen.

A liquid crystal panel is used as an image display element in the explanation of each embodiment mentioned above, but an image display element, other than a liquid crystal panel, may also be used.

According to the second embodiment, the shape, size and brightness of an irradiation region of illumination light essentially do not change when the position of an irradiation region relative to an image display element is adjusted by shifting the first and the third reflecting optical elements. Therefore, an irradiation region relative to an image display element of illumination light can be easily adjusted at an appropriate position while hardly causing an irradiation region which is unmatched to a screen size of an image display element, and a change in brightness of illumination and uneven illumination.

Moreover, an irradiation region of illumination light can be adjusted more easily by shifting the first and the third reflecting optical elements in one body than by shifting them individually.

In the second embodiment, the first and the third reflecting optical elements can be easily fixed to a housing during and after the positioning of an irradiation region as the first and the third reflecting optical elements are shifted along reference guide faces, formed at the housing as parallel faces in an orthogonal direction to a normal of a reflection face of the second reflecting optical element.

According to the third embodiment, the shape, size and brightness of an irradiation region of illumination light essentially do not change when the position of an irradiation region relative to an image display element is adjusted by shifting the second reflecting optical elements. Therefore, an irradiation region relative to an image display element of illumination light can be easily adjusted at an appropriate position while hardly causing an irradiation region which is unmatched to a screen size of an image display element, and a change in brightness of illumination and uneven illumination.

In the third embodiment, the second reflecting optical element can be easily fixed to a housing during and after the positioning of an irradiation region as the second reflecting optical element is shifted along a reference guide face which is formed at the housing as a parallel face in an orthogonal direction to a normal of a reflection face of the second reflecting optical element.

Deformation of the first and the third reflecting optical elements due to a change in environmental temperature, in other words, displacement, a change in brightness and the like of an irradiation region of illumination light relative to an image display element can be restrained in the second and the third embodiment by providing, to the housing, parts which absorb a difference in deformation between the housing and the first and the third reflecting optical elements due to a change in environmental temperature.

What is claimed is:

1. An illumination adjustment method in an image display optical unit which comprises a first reflecting optical element having a curved surface to reflect illumination light from a light source;

a second reflecting optical element having a curved surface to reflect illumination light reflected at the first reflecting optical element, and a third reflecting optical element having a curved surface to reflect illumination light reflected at the second reflecting optical element for guiding light to an image display element, comprising the step of:

adjusting a position of an irradiation region of the illumination light on the image display element by moving the first reflecting optical element and the third reflecting optical element relative to the second reflecting optical element;

wherein the first and third reflecting optical elements are moved in a direction where a shape and brightness of the irradiation region of the illumination light on the image display element essentially do not change.

2. The method according to claim 1, wherein the first reflecting optical element and the third reflecting optical element are constituted in one body, and are moved in one body.

3. The method according to claim 2, wherein a housing for holding the image display element has reference guide surfaces parallel to an orthogonal direction to a normal of a reflection surface of the second reflecting optical element; and the first reflecting optical element and the third reflecting optical element are moved along the reference guide surfaces.

4. The method according to claim 3, wherein the first reflecting optical element and the third reflecting optical element move along the reference guide surfaces while the first reflecting optical element and the third reflecting optical element are temporarily locked to the housing so as to be in contact with the reference guide surfaces.

5. The method according to claim 1, wherein the first reflecting optical element and the third reflecting optical element move while surfaces which are opposite to reflection surfaces of the first reflecting optical element and the third reflecting optical element, are exposed to the outside of the housing.

6. The method according to claim 1, the image display optical unit comprising:

a color separation system to separate illumination light from the light source into three color beams;

three image display elements which are illuminated by each color beam separated by the color separation system; and a relay system as a reflecting optical system to guide at least one color beam among color beams which are separated by the color separation system, to an image display element;

wherein the relay system has the first reflecting optical element, the second reflecting optical element and the third reflecting optical element.

7. An illumination adjustment method in an image display optical unit which comprises a first reflecting optical element having a curved surface to reflect illumination light from a light source;

a second reflecting optical element having a curved surface to reflect illumination light reflected at the first reflecting optical element, and a third reflecting optical element having a curved surface to reflect illumination light reflected at the second reflecting optical element for guiding light to an image display element, comprising the step of:

adjusting a position of an irradiation region of the illumination light on the image display element by moving the first reflecting optical element and the third reflecting optical element relative to the second reflecting optical element;

wherein the first and third reflecting optical elements are moved parallel to a direction which is orthogonal to a normal of a reflection surface of the second reflecting optical element.

8. The method according to claim 7, the image display optical unit comprising:

a color separation system to separate illumination light from the light source into three color beams;

three image display elements which are illuminated by each color beam separated by the color separation system; and a relay system as a reflecting optical system to guide at least one color beam among color beams which are separated by the color separation system, to an image display element;

wherein the relay system has the first reflecting optical element, the second reflecting optical element and the third reflecting optical element.

9. The method according to claim 7, wherein the first reflecting optical element and the third reflecting optical element are constituted in one body, and are moved in one body.

10. The method according to claim 7, wherein the first reflecting optical element and the third reflecting optical element move while faces which are opposite to reflection faces of the first reflecting optical element and the third reflecting optical element, are exposed to the outside of the housing.

11. An illumination adjustment method in an image display optical unit which comprises a first reflecting optical element having a curved surface to reflect illumination light from a light source;

a second reflecting optical element having a curved surface to reflect illumination light reflected at the first reflecting optical element, and a third reflecting optical element having a curved surface to reflect illumination light reflected at the second reflecting optical element for guiding light to an image display element, comprising the step of:

adjusting a position of an irradiation region of the illumination light on the image display element by moving the second reflecting optical element relative to the first reflecting optical element and the third reflecting optical element;

wherein the second reflecting optical element is moved in a direction where a shape and brightness of the irradiation region of the illumination light on the image display element essentially do not change.

12. The method according to claim 11, the image display optical unit comprising:

a color separation system to separate illumination light from the light source into three color beams;

three image display elements which are illuminated by each color beam separated by the color separation system; and a relay system as a reflecting optical system to guide at least one color beam among color beams which are separated by the color separation system, to an image display element;

wherein the relay system has the first reflecting optical element, the second reflecting optical element and the third reflecting optical element.

13. An illumination adjustment method in an image display optical unit which comprises a first reflecting optical element having a curved surface to reflect illumination light from a light source;

a second reflecting optical element having a curved surface to reflect illumination light reflected at the second reflecting optical element, and a third reflecting optical element having a curved surface to reflect illumination light reflected at the second reflecting optical element for guiding light to an image display element, comprising the step of:

adjusting a position of an irradiation region of the illumination light on the image display element by moving the second reflecting optical element relative to the first reflecting optical element and the third reflecting optical element;

wherein the second reflecting optical element is moved parallel to a direction which is orthogonal to a normal of a reflection surface of the second reflecting optical element.

14. The method according to claim 13, the image display optical unit comprising:

a color separation system to separate illumination light from the light source into three color beams;

three image display elements which are illuminated by each color beam separated by the color separation system; and a relay system as a reflecting optical system to guide at least one color beam among color beams which are separated by the color separation system, to an image display element;

wherein the relay system has the first reflecting optical element, the second reflecting optical element and the third reflecting optical element.

15. An image display optical unit comprising:

a first reflecting optical element having a curved surface to reflect illumination light from a light source;

a second reflecting optical element having a curved surface to reflect illumination light reflected at the first reflecting optical element;

a third reflecting optical element having a curved surface to reflect illumination light reflected at the second reflecting optical element, and to guide light to an image display element; and a housing to hold the image display element, wherein the housing has reference guide surfaces to shift and guide the first reflecting optical element and the third reflecting optical element into a direction where a shape and brightness of an irradiation region to the image display element essentially do not change during positioning of the irradiation region of illumination light to the image display element; and wherein the first reflecting optical element and the third reflecting optical element are fixed onto the reference guide surfaces.

16. The image display optical unit according to claim 15, wherein the first reflecting optical element and the third reflecting optical element are constituted in one body.

17. The image display optical unit according to claim 15, herein the first reflecting optical element and the third reflecting optical element are fixed to the housing so as to expose faces which are opposite to reflection faces of the first reflecting optical element and the third reflecting optical element, to outside of the housing.

18. The image display optical unit according to claim 15, wherein the housing has parts to absorb a difference in deformations between the housing, and the first optical reflecting element and the third optical reflecting element caused by a change in environmental temperature.

19. The image display optical unit according to claim 15, further comprising:

a color separation system to separate illumination light from a light source into three color beams;

three image display elements illuminated by each color beam separated by the color separation system; and a relay system as a reflecting optical system to guide at least one color beam among color beams separated by the color separation system; wherein the first reflecting optical element, the second reflecting optical element and the third reflecting optical element constitute the relay system.

20. An image display apparatus comprising:

at least one image display element;

the image display optical unit according to claim 15, wherein the unit has an illumination optical system to guide light from the light source to the image display element; and a projection optical system to project image light from the image display element onto a projection surface.

21. An image display optical unit comprising:

a first reflecting optical element having a curved surface to reflect illumination light from a light source;

a second reflecting optical element having a curved surface to reflect illumination light reflected at the first reflecting optical element;

a third reflecting optical element having a curved surface to reflect illumination light reflected at the second reflecting optical element, and to guide light to an image display element; and a housing to hold the image display element, wherein the housing has reference guide surfaces to parallel shift and guide the first reflecting optical element and the third reflecting optical element relative to the second reflecting optical element into an orthogonal direction to a normal of a reflection surface of the second reflecting optical element, during positioning of an irradiation region of illumination light to the image display element; and wherein the first reflecting optical element and the third reflecting optical element are fixed onto the reference guide surfaces.

22. The image display optical unit according to claim 21, wherein the first reflecting optical element and the third reflecting optical element are constituted in one body.

23. The image display optical unit according to claim 21, wherein the first reflecting optical element and the third reflecting optical element are fixed to the housing so as to expose faces which are opposite to reflection faces of the first reflecting optical element and the third reflecting optical element, to outside of the housing.

24. The image display optical unit according to claim 21, wherein the housing has parts to absorb a difference in deformations between the housing, and the first optical reflecting element and the third optical reflecting element caused by a change in environmental temperature.

25. The image display optical unit according to claim 21, further comprising:

a color separation system to separate illumination light from a light source into three color beams;

three image display elements illuminated by each color beam separated by the color separation system; and a relay system as a reflecting optical system to guide at least one color beam among color beams separated by the color separation system;

wherein the first reflecting optical element, the second reflecting optical element and the third reflecting optical element constitute the relay system.

26. An image display apparatus comprising:

at least one image display element;

the image display optical unit according to claim 21, wherein the unit has an illumination optical system to guide light from the light source to the image display element; and a projection optical system to project image light from the image display element onto a projected surface.

27. An image display optical unit comprising:
- a first reflecting optical element having a curved surface to reflect illumination light from a light source;
- a second reflecting optical element having a curved surface to reflect illumination light reflected at the first reflecting optical element;
- a third reflecting optical element having a curved surface to reflect illumination light reflected at the second reflecting optical element, and to guide light to an image display element; and
- a housing to hold the image display element, wherein the housing has a reference guide surface to shift and guide the second reflecting optical element relative to the first reflecting optical element and the third reflecting optical element into a direction where a shape and brightness of an irradiation region to the image display element essentially do not change during positioning of the irradiation region of illumination light to the image display element; and
- wherein the second reflecting optical element is fixed onto the reference guide face.

28. The image display optical unit according to claim 27, wherein the first reflecting optical element and the third reflecting optical element are constituted in one body.

29. The image display optical unit according to claim 28, wherein the first reflecting optical element and the third reflecting optical element are fixed to the housing so as to expose faces which are opposite to reflection faces of the first reflecting optical element and the third reflecting optical element, to outside of the housing.

30. The image display optical unit according to claim 27, wherein the housing has parts to absorb a difference in deformations between the housing, and the first optical reflecting element and the third optical reflecting element caused by a change in environmental temperature.

31. The image display optical unit according to claim 27, further comprising:
- a color separation system to separate illumination light from a light source into three color beams;
- three image display elements illuminated by each color beam separated by the color separation system; and
- a relay system as a reflecting optical system to guide at least one color beam among color beams separated by the color separation system;
- wherein the first reflecting optical element, the second reflecting optical element and the third reflecting optical element constitute the relay system.

32. An image display apparatus comprising:
- at least one image display element;
- the image display optical unit according to claim 27, wherein the unit has an illumination optical system to guide light from the light source to the image display element; and
- a projection optical system to project image light from the image display element onto a projection surface.

33. An image display optical unit comprising:
- a first reflecting optical element having a curved surface to reflect illumination light from a light source;
- a second reflecting optical element having a curved surface to reflect illumination light reflected at the first reflecting optical element;
- a third reflecting optical element having a curved surface to reflect illumination light reflected at the second reflecting optical element, and to guide light to an image display element; and
- a housing to hold the image display element, wherein the housing has a reference guide face to parallel shift and guide the second reflecting optical element relative to the first reflecting optical element and the third reflecting optical element into an orthogonal direction to a normal of a reflection face of the second reflecting optical element during positioning of the irradiation region of illumination light to the image display element; and
- wherein the second reflecting optical element is fixed onto the reference guide face.

34. The image display optical unit according to claim 33, wherein the first reflecting optical element and the third reflecting optical element are constituted in one body.

35. The image display optical unit according to claim 32, wherein the first reflecting optical element and the third reflecting optical element are fixed to the housing so as to expose faces which are opposite to reflection faces of the first reflecting optical element and the third reflecting optical element, to outside of the housing.

36. The image display optical unit according to claim 32, wherein the housing has parts to absorb a difference in deformations between the housing, and the first reflecting element and the third optical reflecting element caused by a change in environmental temperature.

37. The image display optical unit according to claim 33, further comprising:
- a color separation system to separate illumination light from a light source into three color beams;
- three image display elements illuminated by each color beam separated by the color separation system; and
- a relay system as a reflecting optical system to guide at least one color beam among color beams separated by the color separation system;
- wherein the first reflecting optical element, the second reflecting optical element and the third reflecting optical element constitute the relay system.

38. An image display apparatus comprising:
- at least one image display element;
- the image display optical unit according to claim 33, wherein the unit has an illumination optical system to guide light from the light source to the image display element; and
- a projection optical system to project image light from the image display element onto a projection surface.

39. An image display optical unit comprising:
- a first reflecting optical element having a surface to reflect illumination light from a light source;
- a second reflecting optical element having a surface to reflect illumination light reflected at the first reflecting optical element;
- a third reflecting optical element having a surface to reflect illumination light reflected at the second reflecting optical element and to guide light to an image display element; and
- a guiding mechanism which guides movement of one or two of the first, second and third reflecting optical elements relative to the remaining reflecting optical element in a direction where a shape and brightness of an irradiation region of the illumination light on the image display element essentially do not change.

40. The image display optical unit according to claim 39, further comprising:
- a color separation system to separate illumination light from the light source into three color beams;

three image display elements illuminated by each color beam separated by the color separation system; and a relay system as a reflecting optical system to guide at least one color beam among the three color beams separated by the color separation system;

wherein the first, second and third reflecting optical elements constitute the relay system.

41. An image display apparatus comprising:

the image display optical unit according to claim 39, wherein the unit has at least one image display element;

an illumination optical system to guide illumination light from the light source to the image display element; and a projection optical system to project image light from the image display element onto a projection surface.

42. An image display optical unit comprising:

a first reflecting optical element having a surface to reflect illumination light from a light source;

a second reflecting optical element having a surface to reflect illumination light reflected at the first reflecting optical element;

a third reflecting optical element having a surface to reflect illumination light reflected at the second reflecting optical element and to guide light to an image display element; and a guiding mechanism which guides movement of one or two of the first, second and third reflecting optical elements relative to the remaining reflecting optical element in a direction along the surface of the second reflecting optical element.

43. The image display optical unit according to claim 42, further comprising:

a color separation system to separate illumination light from the light source into three color beams;

three image display elements illuminated by each color beam separated by the color separation systems; and a relay system as a reflecting optical system to guide at least one color beam among the color beams separated by the color separation system;

wherein the first, second and third reflecting optical elements constitute the relay system.

44. An image display apparatus comprising:

the image display optical unit according to claim 42, wherein the unit has at least one image display element;

an illumination optical system to guide illumination light from the light source to the image display element; and a projection optical system to project image light from the image display element onto a projection surface.

* * * * *

UNITED STATES PATENT AND TRADEMARK OFFICE
CERTIFICATE OF CORRECTION

PATENT NO. : 6,623,123 B2
DATED : September 23, 2003
INVENTOR(S) : Masaharu Eguchi et al.

It is certified that error appears in the above-identified patent and that said Letters Patent is hereby corrected as shown below:

Column 19,
Line 26, please delete "28" and insert therefore -- 27 --

Column 20,
Lines 15 and 21, please delete "32" and insert therefore -- 33 --

Signed and Sealed this

Seventeenth Day of February, 2004

JON W. DUDAS
*Acting Director of the United States Patent and Trademark Office*